(No Model.)  2 Sheets—Sheet 1.

A. SCHMITT.
AWNING SHUTTER OR BLIND.

No. 534,523.  Patented Feb. 19, 1895.

WITNESSES:
John J. Rennie
J. Fred. Acker

INVENTOR
A. Schmitt
BY
[signature]
ATTORNEYS.

THE NORRIS PETERS CO., PHOTO-LITHO., WASHINGTON, D. C.

(No Model.) 2 Sheets—Sheet 2.
A. SCHMITT.
AWNING SHUTTER OR BLIND.
No. 534,523. Patented Feb. 19, 1895.
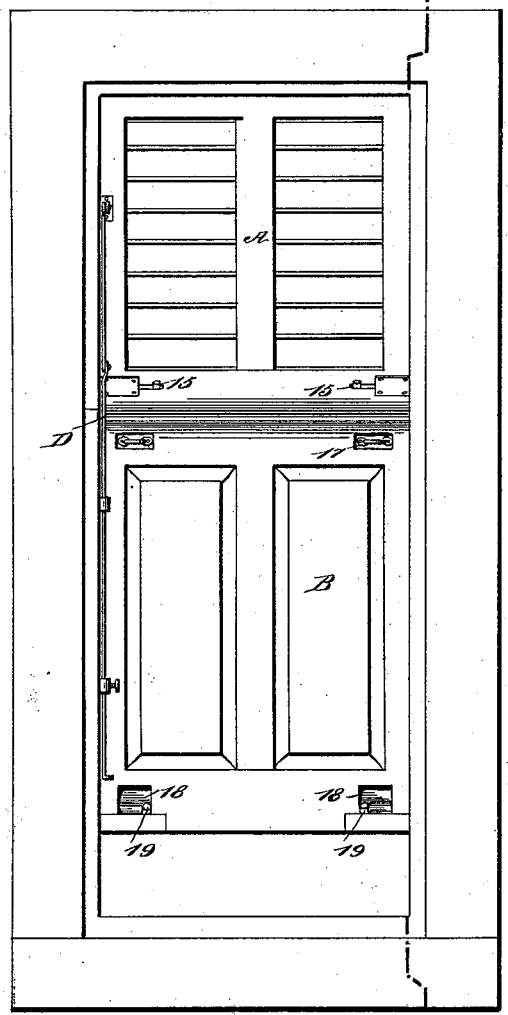
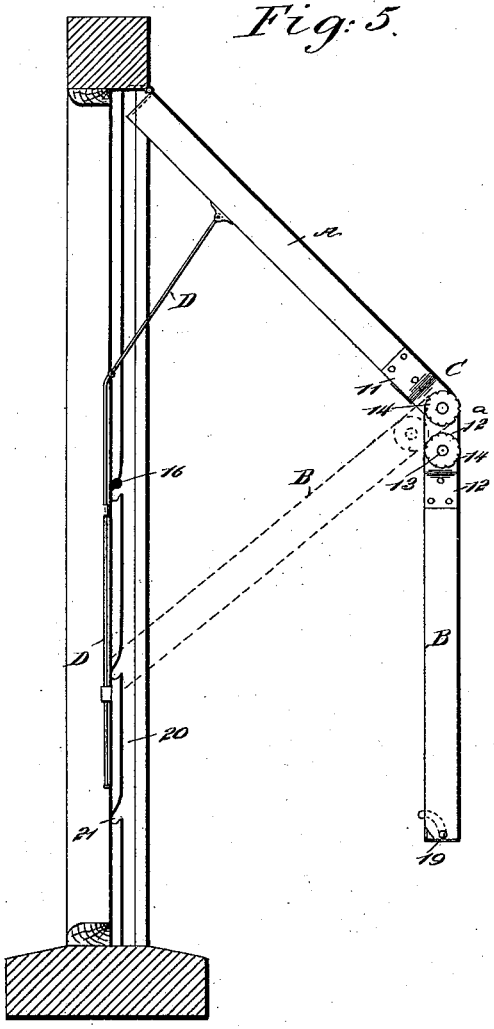
WITNESSES:
John A. Rennie
Fred. Acker
INVENTOR
A. Schmitt
BY
ATTORNEYS.

UNITED STATES PATENT OFFICE.

ANDREW SCHMITT, OF BROOKLYN, NEW YORK.

AWNING SHUTTER OR BLIND.

SPECIFICATION forming part of Letters Patent No. 534,523, dated February 19, 1895.

Application filed November 8, 1894. Serial No. 528,234. (No model.)

*To all whom it may concern:*

Be it known that I, ANDREW SCHMITT, of Brooklyn, in the county of Kings and State of New York, have invented a new and Improved Awning Shutter or Blind, of which the following is a full, clear, and exact description.

My invention relates to an improvement in awning shutters and blinds, and it has for its object to provide an awning or shutter which may be held in various positions, enabling it to be used as an awning, or as a shield for a window or other opening to which the shutter appertains, the shutter itself being adapted likewise for use in the display of a sign or for displaying goods, as may be desired.

A further object of the invention is to provide an awning shutter or blind which will be simple and economic in its construction, and capable of expeditious and convenient adjustment to its various positions, the shutter being likewise capable of being locked in a manner to completely close the opening it is intended to cover.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
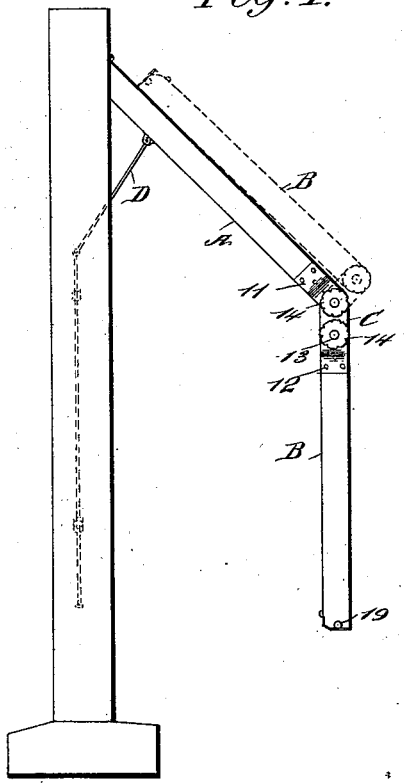
Figure 2:
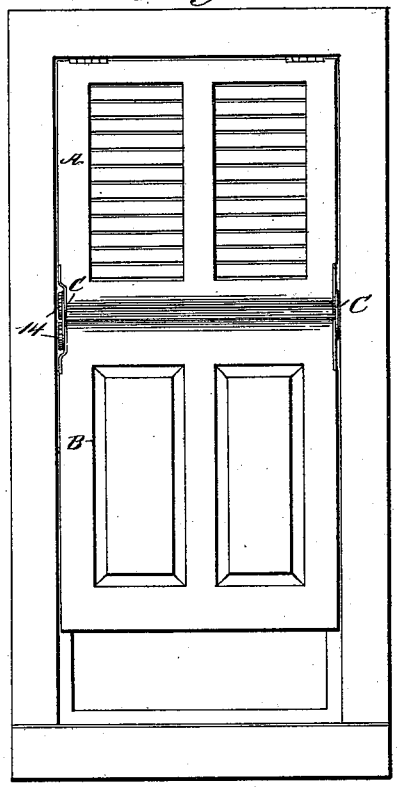
Figure 3:
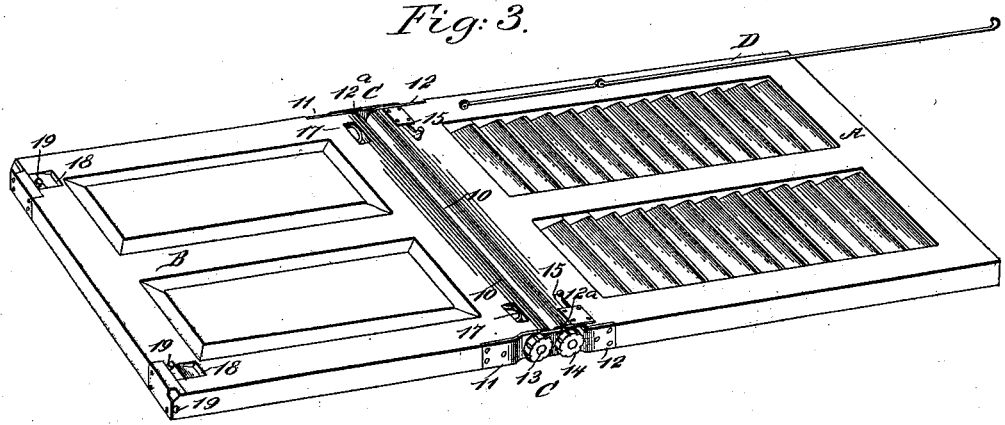

Figure 1 is a side elevation of a window, illustrating the shutter or blind as opened out therefrom to form an awning, or a shield from the sun and weather, yet admitting of ready access to the window. Fig. 2 is a front elevation of the shutter and the window, the shutter being in the position shown in Fig. 1. Fig. 3 is a detail perspective view of the shutter removed from the window, and viewed from its inner side. Fig. 4 is an inner face view of the window and shutter, the latter being in the position shown in positive lines in Figs. 1 and 5; and Fig. 5 is a vertical section through the window frame, and an edge view of the shutter, the section being taken on the line 5—5 of Fig. 4, and the shutter being likewise shown in a second position in dotted lines.

In carrying out the invention the shutter is made in two sections, an upper section A and a lower section B. Either or both of the sections may be solid, or they may be slatted, and the slats may likewise be of the Venetian order. Where the two sections of the shutter abut their opposing surfaces are rounded off, or rendered more or less cylindrical, as illustrated at 10 in Fig. 3, the said surfaces being the lower portion of the upper section and the upper portion of the lower section of the shutter. These two sections of the shutter are connected by two link hinges C, a hinge being placed at each side edge; and the connection between the two shutter sections is such that one section may readily pass by the other; that is to say, the lower section may be folded up upon the upper section, as shown in Fig. 1, or it may be folded to an engagement with the under face of the said upper section, or made to stand at any desired angle relative to the said upper section, as shown in the drawings.

Each link hinge consists preferably of two straps 11 and 12 and a link $12^a$, one strap being secured to one of the sections of the shutter, and the other strap to the opposite section, and the shutter sections on one side where these straps are attached are recessed so that the straps where they abut may be curved inwardly, as is shown in Figs. 2 and 3. The central link $12^a$ is pivotally connected with both straps. The two pivots 13 of each link of the hinge is made to extend outward, and are threaded to receive a thumb nut 14, the recessed side edges of the shutter sections admitting of the nuts 14 having their outer faces in a plane with the outer side edges of both sections. Thus it will be observed that by loosening the thumb nuts 14, the lower portion of the shutter may be placed in any desired position relative to the upper section, and by tightening up the nuts the lower section will be held in that position. The upper shutter section has a hinged or pivotal connection with the upper portion of the window frame, and may be carried outward from the frame, or drawn inward so as to entirely or partially close the opening in the frame, which may be accomplished by means of a sash lift D of any approved construction, as shown in Figs. 1 and 5; or, instead of the sash lift, braces may be attached to the inner face of the upper shutter section and sockets may be provided to receive the inner ends of the braces located upon the inner faces of the uprights of the frame, as for example, the brace may be in the nature of a hook, and the socket may be in the nature of an eye.

Upon the inner face of the upper shutter section at each side a countersunk bolt 15 is located, and these bolts are adapted to enter suitable openings 16 made in the frame, as shown in Fig. 5, when the said upper section of the shutter is closed inward against the frame; and at or near the upper edge of the lower shutter section a handle 17 is preferably countersunk in the inner face of the said section, as shown in Fig. 3, whereby this section may be readily drawn in and closed; and handles or hand-holds 18 are also produced upon the inner face of the lower section near its lower edge, preferably one at each side, and at or near the extreme lower edge of this lower section upon its inner face two countersunk bolts 19, are placed, one near each side, which enter openings in the frame when the lower shutter section is also closed inward; but instead of the openings in the frame to receive the bolts of the lower shutter section, the inner face of each upright of the frame may be provided with a vertical groove 20 as shown in Fig. 5, and when the bolts enter said grooves the shutter will be fastened to the frame.

It is sometimes desirable to bow the shutter sections, as shown partially in positive and partially in dotted lines in Fig. 5, and this is accomplished by throwing the bolts 19 at the bottom of the lower section into the grooves 20, and lifting up the lower section as far as may be desired, or until the bolts are seated in recesses 21 prepared to receive them in the inner walls of the grooves 20, the recesses being at predetermined distances apart. No recesses are required however at the upper portions of the grooves, since when the lower shutter section is carried up well above the center of the window it will be self-sustaining, owing to the inward pressure exerted thereon by the upper section which it will support.

It will thus be observed that such a shutter may be used as a shield for the opening it is intended directly to close, and yet the shutter may be held at such a distance from the window and in such a position as to permit persons to look out from said window, and other persons to readily look into the window. Furthermore the shutter may be used as a support for signs, or other advertising matter, or may be employed to support merchandise if found desirable.

Having thus described my invention, I claim as new and desire to secure by Letters Patent—

1. An awning shutter constructed in sections having adjacent rounded edges and link hinges connecting the same, one of said sections being provided with a locking device for locking it to the other section, substantially as set forth.

2. An awning shutter constructed in sections, link hinges connecting said sections, whereby one section may be passed over and beyond the other, and lock nuts located upon the pivots of one or more of the hinges, whereby the lower section of the shutter may be held in any desired position relative to the upper section, as and for the purpose set forth.

3. The combination, with a frame, of an awning shutter or blind having a hinged connection with the frame, the said shutter or blind being constructed in sections, the abutting edges of the sections being rounded off, link hinges connecting the sections, the pivots of one or more of the hinges being provided with lock nuts whereby the hinges may be held rigid, means, substantially as shown and described, for elevating the upper section of the shutter, and locking devices whereby both sections may be locked to the frame, as and for the purpose specified.

4. The combination, with a frame having grooves in the inner face of its uprights, and provided with sockets formed in one side wall of said grooves, of an awning shutter or blind hinged at the top to the frame, the said blind being constructed in sections, link hinges connecting the sections, whereby one section may be passed over the end of the other, and locking devices located upon the pivots of one or more of the hinges, bolts located upon the inner faces of both sections, the bolts of the lower section being adapted to enter the grooves in the frame and travel therein when necessary, and means, substantially as described, for raising and lowering the upper section of the shutter, as and for the purpose set forth.

5. An awning shutter constructed in sections having adjacent rounded edges, and link-hinges connecting said sections pivotally together, substantially as set forth.

6. An awning shutter constructed in sections one of which has a hinged connection with the frame and is provided with means whereby it may be adjusted and locked to the frame, the other section being pivotally connected to the first named section and having means for locking it in position relatively thereto, substantially as set forth.

7. An awning shutter constructed in sections one of which has a hinged connection with the frame, the other section being hinged at one end to the first named section and having means for locking it fast thereto, the other end of said last named section being provided with means for holding it to the window frame, substantially as set forth.

8. An awning shutter constructed in sections hinged together, each section being provided with means whereby it may be adjusted and locked to the frame independently of the other section, substantially as set forth.

9. An awning shutter constructed in sections hinged together and provided with means for locking said sections together, each section being provided with means whereby it may be adjusted and locked to the frame independently of the other section, substantially as set forth.

ANDREW SCHMITT.

Witnesses:
PHILIP SCHMITT,
ANDREW PETER SCHMITT.